(12) United States Patent
Checiches et al.

(10) Patent No.: US 8,033,293 B2
(45) Date of Patent: Oct. 11, 2011

(54) FLUID REGULATOR

(75) Inventors: Dragos Checiches, Cluj-Napoca (RO); Horatiu Petru Tripon, Cluj-Napoca (RO); Theodor Cojocaru, Cluj-Napoca (RO); Christian Baseler, Lübeck (DE); Anja Bergemann, Carlow (DE); Thorsten Henck, Hamburg (DE)

(73) Assignee: Tescom Corporation, Elk River, MN (US)

( * ) Notice: Subject to any disclaimer, the term of this patent is extended or adjusted under 35 U.S.C. 154(b) by 626 days.

(21) Appl. No.: 12/144,487

(22) Filed: Jun. 23, 2008

(65) Prior Publication Data

US 2009/0314360 A1    Dec. 24, 2009

(51) Int. Cl.
*F16K 31/12*    (2006.01)
*G05D 16/02*    (2006.01)

(52) U.S. Cl. .................. 137/556; 137/505; 137/505.25; 251/248; 251/250

(58) Field of Classification Search .............. 137/505, 137/613, 559, 505.25, 505.42; 251/248, 251/250, 249.5
See application file for complete search history.

(56) References Cited

U.S. PATENT DOCUMENTS 3,856,042 A * 12/1974 Fletcher et al. .......... 137/505.42
3,998,227 A    12/1976 Holbrook et al.
5,760,301 A     6/1998 Shuman, Jr.
6,116,242 A     9/2000 Frye et al.
6,158,457 A * 12/2000 Byrd et al. ............... 137/505.25
2004/0221919 A1 11/2004 MacNeal et al.

FOREIGN PATENT DOCUMENTS

WO    WO-2008-009941 A1    1/2008

OTHER PUBLICATIONS

International Search Report for PCT/US2009/044796, mailed Jan. 6, 2010.
Written Opinion of the International Searching Authority for PCT/US2009/044796, mailed Jan. 6, 2010.

* cited by examiner

*Primary Examiner* — Kevin Lee
(74) *Attorney, Agent, or Firm* — Marshall, Gerstein & Borun LLP

(57) ABSTRACT

A fluid regulator includes a valve block having an inlet arranged for connection to a gas supply and an outlet arranged for connection to an item of gas equipment and defining a flow path. The valve block may include one or more of a pressure regulator, a metering valve, and an on-off switch disposed in the flow path. A rotatable pinion operatively is coupled to the metering valve, and a hand control is coupled to the valve block and rotatable about an axis and includes a toothed rack movable with the hand control. A spring biases the toothed rack toward pinion to provide improved precision and/or less play between internal components. The fluid regulator they also include a balanced gear assembly for rotating a control rod of the valve, and further may be adapted to provide various visual indicators of the on-off the state of the device.

37 Claims, 17 Drawing Sheets

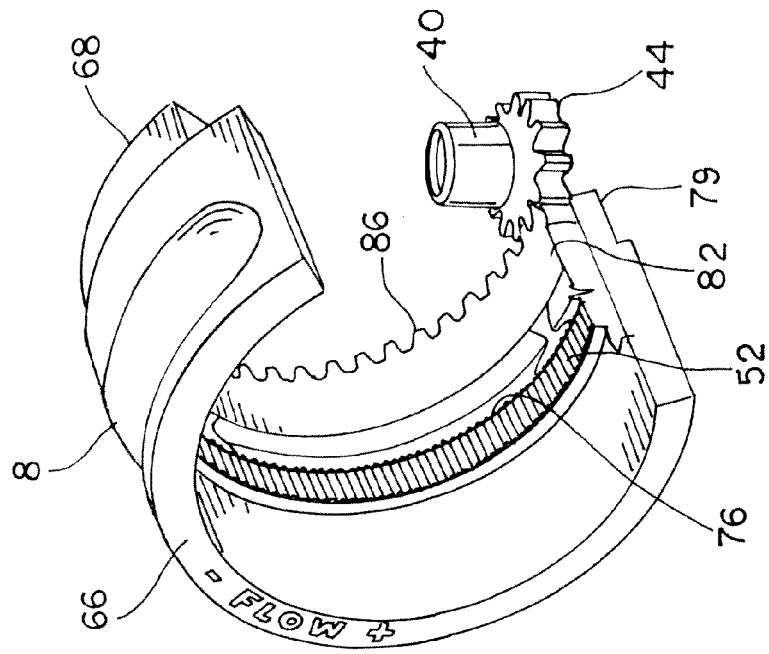
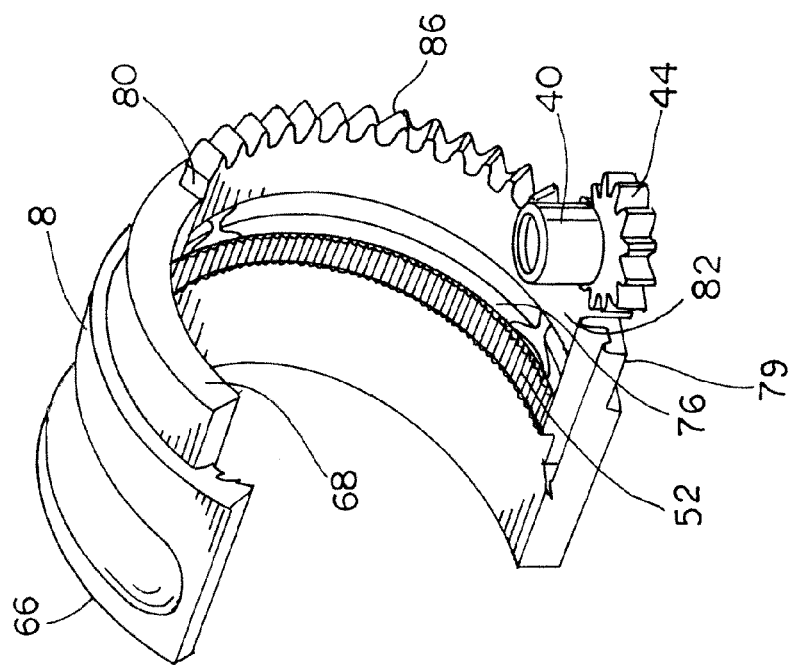

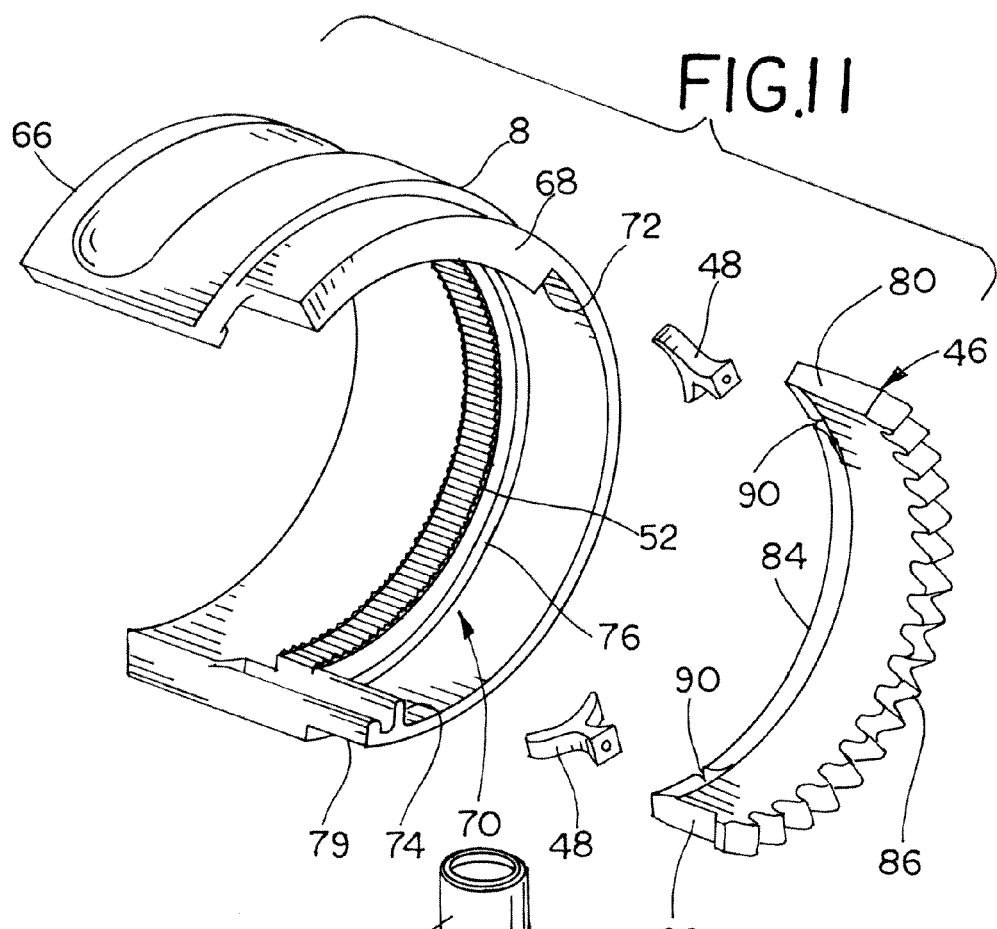
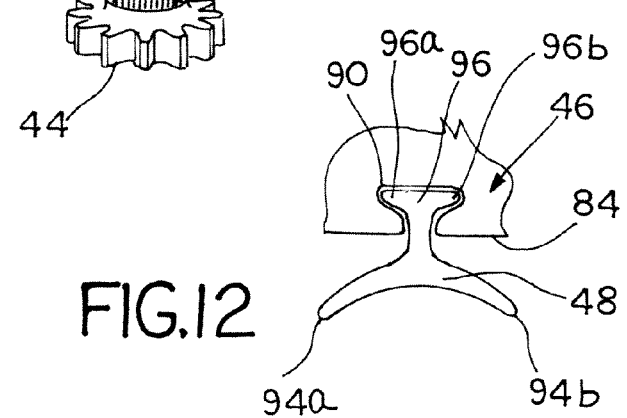

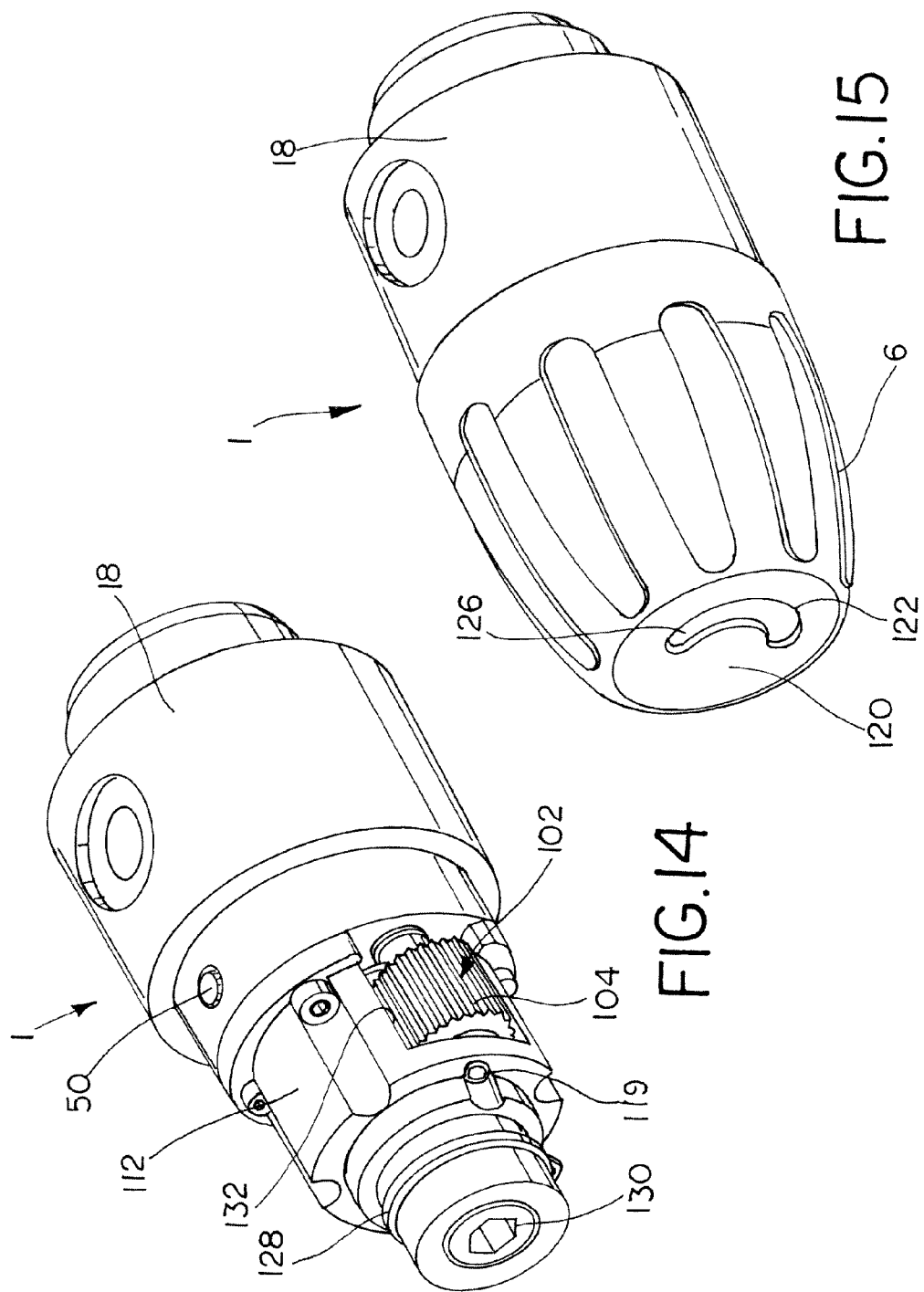

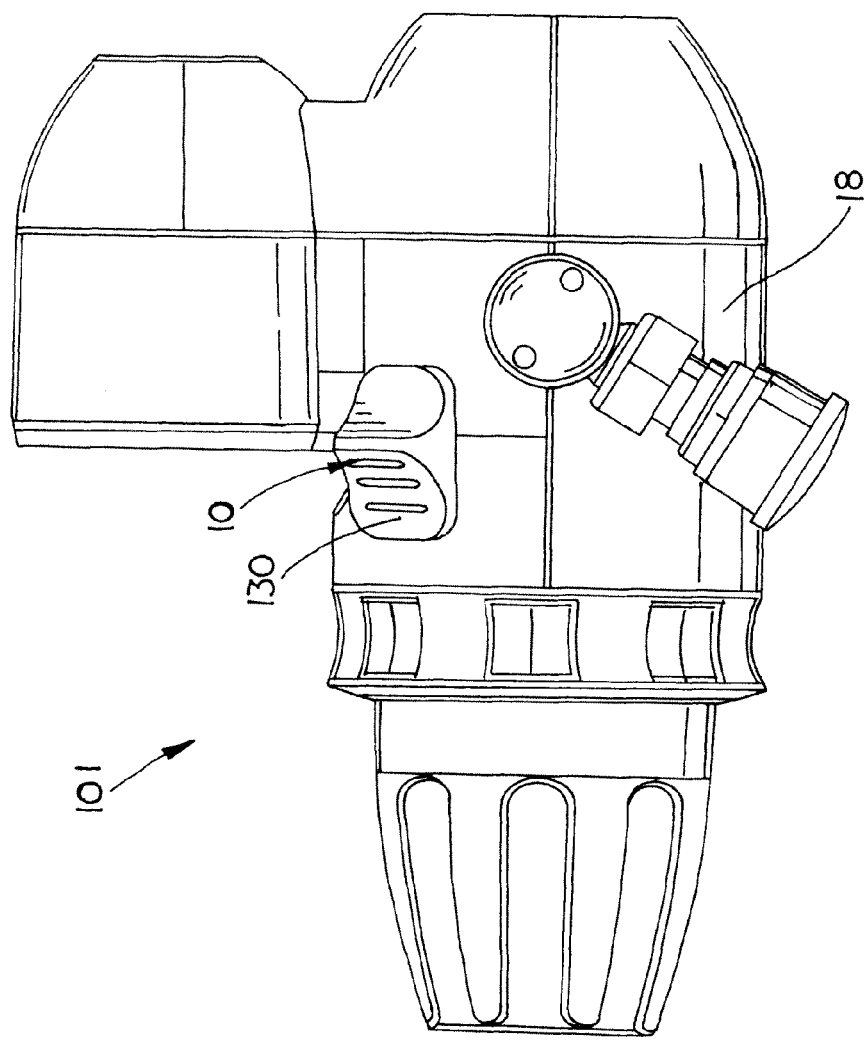

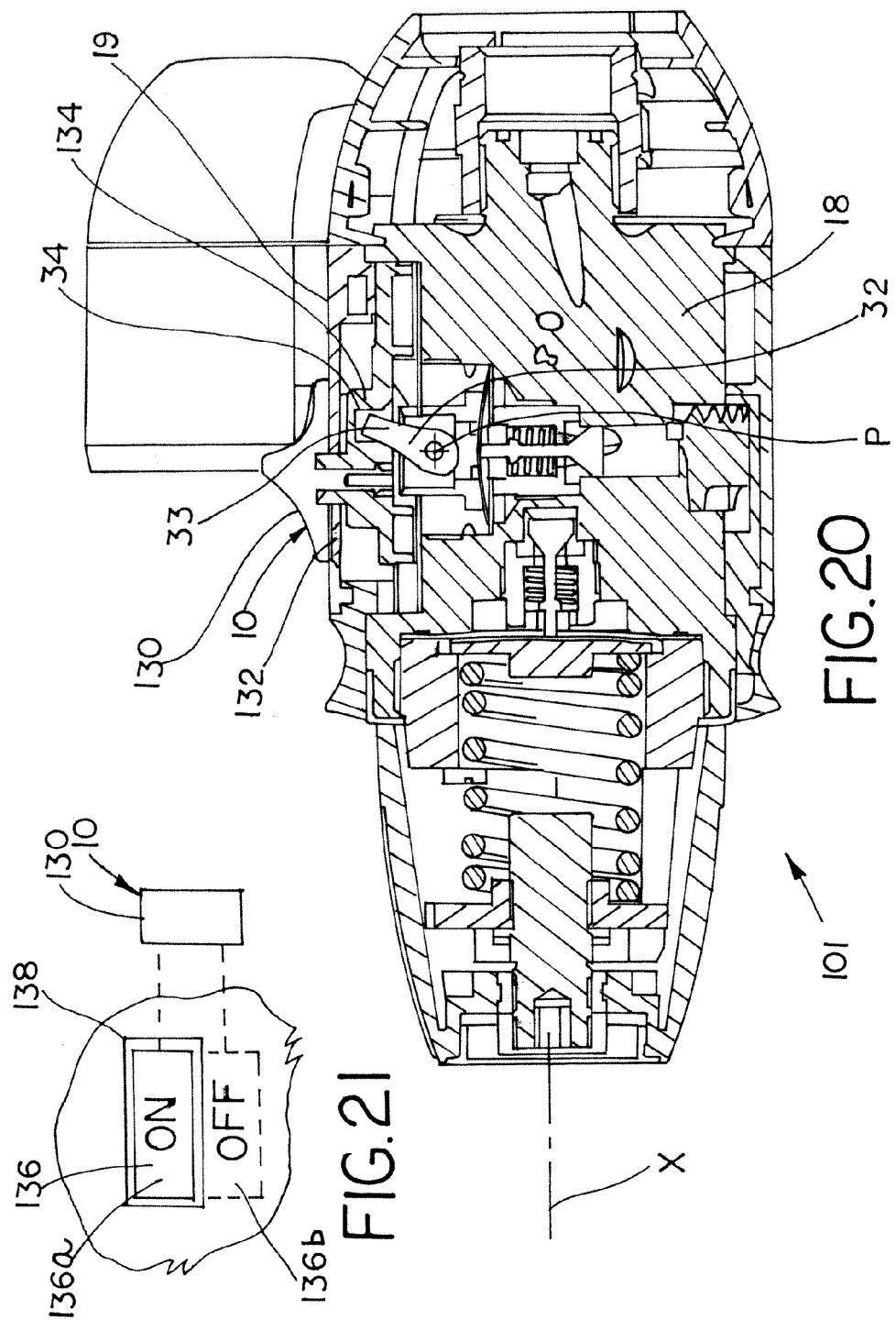

FLUID REGULATOR

FIELD OF THE INVENTION

The present invention relates generally to fluid regulators of the type commonly used in hospitals and other settings for controlling the pressure and flow rate of oxygen delivered form an oxygen tank. More specifically, the present invention relates to improved fluid regulators having one or more features for improving operational aspects of such devices, such as better flow control, better feel, and additional visual indicators regarding the operational state of the device.

BACKGROUND

Fluid regulators of the type commonly used in hospitals or laboratories are generally known. Hospitals and laboratories often have a wide variety of medical, analytical, and other equipment that require connection to a gas source, and the fluid regulators allow hospital or laboratory personnel to conveniently connect the equipment to a gas source, and to use the fluid regulator to control the pressure, the flow rate, or other operational parameters of the gas flowing to the equipment. Because fluid regulators are typically used in connection with a central gas supply, the devices typically require a variety of control elements as pressure regulators, pressure gauges, shut-off valves and metering valves, such that the user can turn the gas feed on and off, and such that the user can control the gas pressure and the gas flow rate.

BRIEF DESCRIPTION OF THE DRAWINGS

FIG. 9 is a perspective view of a portion of the rotation ring including a spring biased rack which is shown engaging a gear or pinion which in turn is coupled to the metering valve.

FIG. 10 is another perspective view of the portion of the rotation ring of FIG. 9.

FIG. 11 is an exploded view in perspective of the assembly illustrated in FIGS. 9 and 10.

FIG. 12 is an enlarged fragmentary view of an exemplary spring and corresponding notch on the control element.

FIG. 14 is a fragmentary view in perspective of the fluid regulator of FIG. 13 and with the handwheel removed.

FIG. 15 a perspective view of the fluid regulator of FIGS. 13 and 14 and showing the handwheel in place.

FIG. 19 is a side elevational view thereof.

FIG. 20 is a cross-sectional view thereof.

FIG. 21 is an enlarged fragmentary plan view illustrating a viewing window and an indicator panel visible through the viewing window and coupled to an external hand control in the form of a button.

DETAILED DESCRIPTION OF THE PREFERRED EMBODIMENTS

Figure 1:
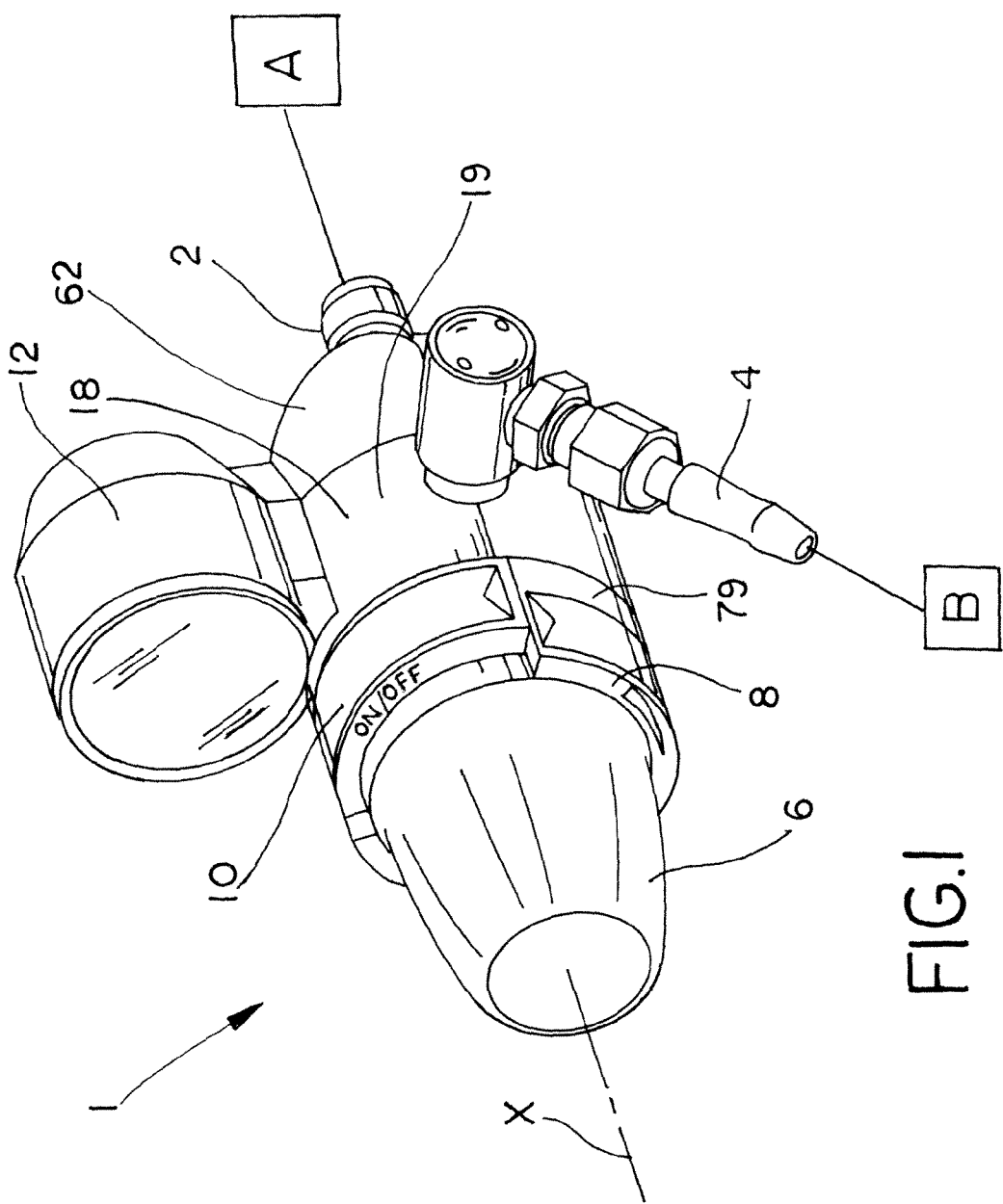
FIG. 1 is a front view in perspective of a fluid regulator assembled in accordance with a first disclosed example of the present invention.
Figure 2:
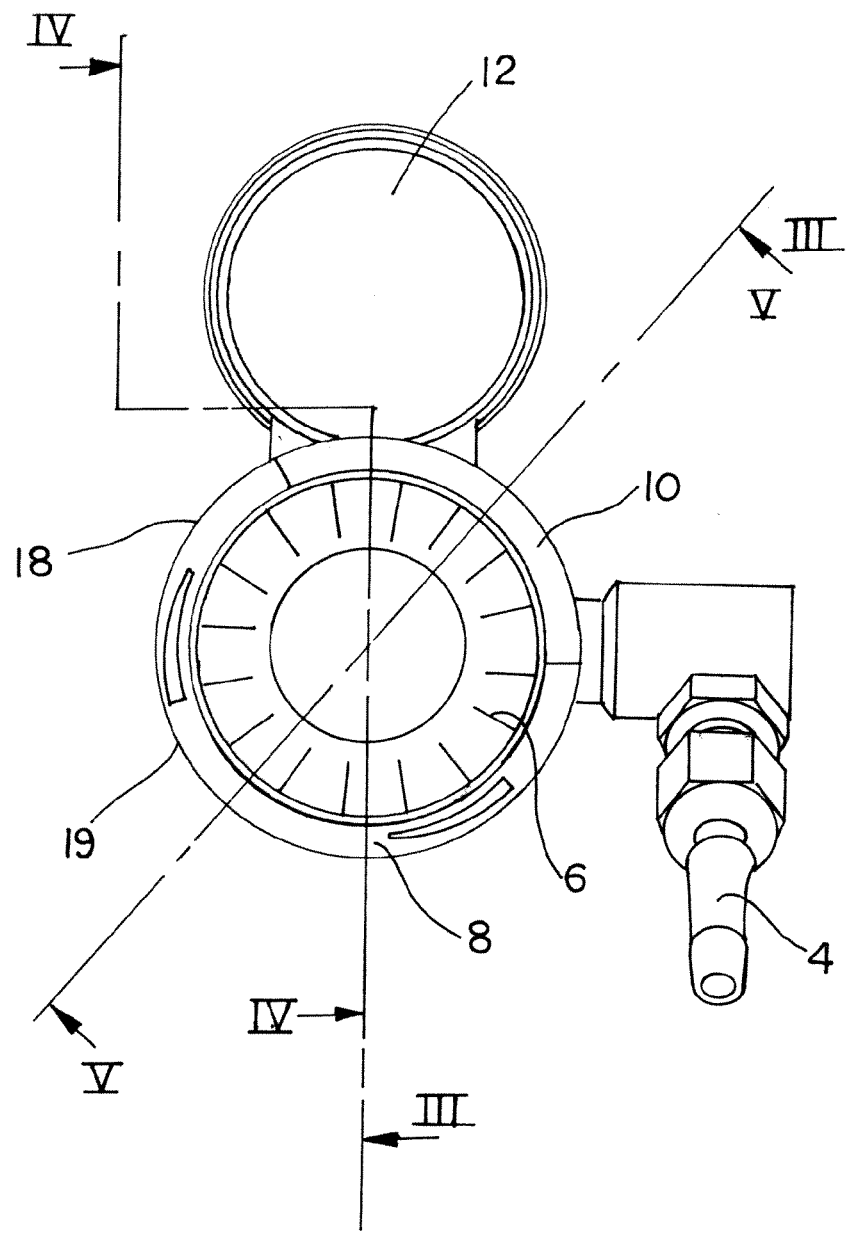
FIG. 2 is a front elevational view of the device shown in FIG. 1.

Although the following text sets forth a detailed description of one or more exemplary embodiments of the invention, it should be understood that the legal scope of the invention or inventions disclosed herein is defined by the words of the appended claims. The detailed description is to be construed as exemplary only and does not describe every possible embodiment or embodiments of the invention, because describing every possible embodiment would be impractical, if not impossible. Numerous alternative embodiments could be implemented using either current technology or technology developed after the filing date of this patent, all of which would still fall within the scope of the claims defining the invention.

Referring now to FIGS. 1-8 of the drawings, a fluid regulator 1 is shown and, as would be understood by those of skill in the art, may be used to extract gas from a gas source which may be, by way of example rather than limitation, a gas tank or manifold, a gas canister, or any other type of gas supply equipment. The fluid regulator 1 has an input connection 2 for connecting with a gas source A (indicated schematically), and an output connection 4 that leads to an external unit B (indicated schematically, and which may be any kind of external unit or system) which requires the gas from the gas source A (inlet). Thus, the connection 4 connects to the external unit B that requires a supply of gas, and also can connect indirectly to the external unit B (outlet) using a variety of connecting hoses or fittings. In accordance with the disclosed example, the fluid regulator preferably integrates three control elements, or up to three control elements, into a single central or integrated component part. In accordance with the disclosed examples, the control elements are situated in a flow path C that extends through the fluid regulator 1 from the input connection 2 to the output connection 4, such that gas can be routed from the gas source A, through the fluid regulator 1, and ultimately to the external unit B. The three control elements may include a pressure regulator 16, a metering valve 14 and a shut-off valve 13, each of which has a corresponding external operating control formed or otherwise mounted on the outside of the housing.

In accordance with the first disclosed example, the fluid regulator includes a valve block 18 having the input connection 2 and the output connection 4. As mentioned above, the flow path C extends through the valve block 18 between the input connection numeral to any output connection 4. Each of the shutoff valve 13, the metering valve 14, and the pressure regulator 16 are situated within the valve block 18 and in the flow path C, such that these control elements may be used to control operational parameters of gas flowing through with the fluid regulator 1. These operational parameters include, for example, gas flow, gas pressure, and an on-off state of the fluid regulator. The fluid regulator 1 further includes one or more external hand controls, such as one or more of a handwheel 6, a rotation ring 8, or a sliding element 10.

In accordance with the disclosed example, and referring still to FIGS. 1-8, the handwheel 6 operates the pressure regulator 16. Preferably, the handwheel 6 is arranged on the front side or the face and can be rotated around a longitudinal axis X. Furthermore, a rotation ring 8 may be provided, with the rotation ring 8 preferably arranged axially offset on or adjacent the rear end of the handwheel 6 in the direction of the longitudinal axis X, and the rotation ring 8 can be rotated concentric about the longitudinal axis X and concentric with the handwheel 6, in order to operate the metering valve 14 inside the fluid regulator 1. Located axially beyond the rotation ring 8 is the sliding element 10 which, in the example shown, is disposed generally adjacent to an outer cylindrical wall 19 of the valve block 18. The sliding element 10 which, as outlined above, is provided to operate the shut-off valve 13, preferably slides along the valve block 18 in a direction parallel to the longitudinal axis X to open or close the shut-off valve 13. In the disclosed example, the sliding element 10 is in the closed or shut off position when the sliding element is pushed axially towards the rear (i.e., away from the face of the handwheel 6 and generally toward the right when viewing FIG. 1). On the other hand, the sliding element may be shifted to an open position by pulling the sliding element 10 toward the front of the device.

The sliding element 10, in the example shown in FIGS. 1-8, is formed as a segment of the rotation ring 8 and can be moved axially relative to the rotation ring 8. Alternatively, the sliding element may comprise a button as will be discussed in greater detail below. In the example of FIG. 1, the sliding element 10 may be rotated together with the rotation ring 8, although the sliding element 10 also can be moved independent of rotational movement to block the fluid regulator without changing the feeding adjustment.

As shown in FIGS. 9-11, the rotation ring 8 preferably includes an outer end 66 and an inner and 68 and, in disclosed example, the rotation ring 8 need not extend all the way around. Instead, as shown, the rotation ring 8 extends roughly 270° about the axis X, leaving room for the sliding element 10. The rotation ring 8 includes a receiving area 70 which, in the disclosed example, is generally arc-shaped or arcuate, and is defined between a pair of edges 72 and 74. The receiving area 70 further includes an annular abutment surface 76 which is oriented perpendicular relative to the axis X. The rotation ring 8 further preferably includes a series of ribs or corrugations 54 which generally span all or a part of an internal surface 78 of the rotation ring 8. The rotation ring 8 includes a side wall 79 (best visible in FIGS. 1 and 9-11), which may be extended to cover the toothed rack 46 and/or the pinion or gear 44. One or more spring-biased balls 50 (an example of which can be seen in FIG. 8) may be mounted to the valve block 18 adjacent a rotational interface 21 between the rotation ring 8 in the valve block 18, with the spring-biased balls 50 positioned to bear against the ribs or corrugations 52.

Referring still to FIGS. 9-11, a toothed rack 46 is provided and is generally arc-shaped or arcuate and is sized to fit within the receiving area 70. The toothed rack 46 includes a pair of edges 80 and 82 which are sized to engage the edges 72 and 74 of the receiving area. The toothed rack 46 further includes a pair of ends 84 and 86. The end 86 includes a plurality of teeth 88. One or more notches 90 are formed in the end 84. One or more springs or spring elements 48 are provided. In the disclosed example, and as can best be seen in FIG. 11, the spring elements 48 include a pair of legs 94a and 94b and a shaped head 96. The legs 94a and 94b are sized and positioned to bear against the abutment surface 76 of the receiving area 70. The shaped head 96 includes a pair of laterally extending arms 96a, 96b and is preferably sized and shaped to fit within the notch 90. Preferably, the notch 90 is sized and shaped to be complementary to the shape of the head 96. The spring elements 48 provide a biasing force which urges the toothed rack 46 toward a pinion or gear 44 which, in the disclosed example, is capable about a vertical axis when viewing the figures and which is operatively coupled to the metering valve 14 and a known manner. The spring elements may be formed of spring steel, nylon, or any other suitable material that allows the spring element or elements 48 to provide a biasing force between the rotation ring 8 and the toothed rack 46, and further may take the form of a coil spring, a resilient member, or any other suitable form or material.

In accordance with the foregoing example, the disclosed assembly may provide very small play between the toothed rack 46 and the gear 44 because of the biasing force. Consequently, there is very small play between the various gearing elements which both improves the actual metering function and also improves the tactile feel to a user. Further, the improved precision and feel may be accomplished without having to resort to exceedingly small tolerances between the associated components. Resorting to increasingly small tolerances tends to undesirably increase manufacturing costs. Further, the spring components may be selected to have greater or lesser biasing force which effectively takes the place of relying on small tolerances for the geared components of the system. One of skill can readily calculate the amount of biasing force required in order to achieve precise actuation between the toothed rack 46 and the gear 44. In accordance with the disclosed example, by pressing the toothed rack 46 against the gear 44, the teeth mesh more firmly which effectively eliminates deadband or slop.

Furthermore, as can be seen in FIG. 1, the fluid regulator 1 also may include a manometer or pressure gauge 12 which, in disclosed example, is arranged on the exterior of the outer cylindrical wall 19 of the valve block 18. As can be particularly seen in FIGS. 3, 4 and 5, the control elements (the shut-off valve 13, the metering valve 14 and/or the pressure regulator 16) are integrated into one valve block 18. Valve block 18 preferably is made of one piece of metal. The pressure regulator 16, the metering valve 14 and the shut-off valve 13 are inserted in recesses or holes in the valve block 18, and the pressure regulator 16 is arranged at the first or front face of the valve block 18. The receptacles for the shut-off valve 13 and the metering valve 14 preferably extend substantially in the radial direction relative to the longitudinal axis X of valve block 18 from the circumferential surface. As mentioned above, the valve block 18 preferably is essentially cylindrical, although other shapes may prove suitable.

The flow path C defined inside of the valve block 18 preferably is formed by drillholes or channels that connect each of the control elements 13, 14 and 16 to one another. Although not only of the internal channels or drill holes are visible in each of the Figures, the drilling of the internal channels and the connection of each of the control elements 13, 14 and 16 in the inner discussed herein is well within the ability of one of ordinary skill in the art. As outlined above, the flow path C initially runs from the connection 2 that forms the gas input to the shut-off valve 13, and from the shutoff valve 13 to the pressure regulator 16 through the channels which need not be shown in greater detail. The flow path C also runs from the pressure regulator 16 to the metering valve 14, and from the metering valve 14 two the connection 4 that forms the output.

A second output 20 (FIGS. 3 and 5) is formed as an alternative connection to the connection 4 (although it is closed in the example of application shown) on the second or rear side face of valve block 18. This second output 20 could be used if an output on the rear side is needed, for example if the fluid regulator shown is supposed to be firmly built into a system. If the output 20 is supposed to be used, then the connection 2 may not be necessary and the corresponding connection recess 22 is sealed in the valve block 18 (that can be seen in FIG. 8). A second connection recess 24 can be identified in FIG. 8 that is sealed in the example shown. The second connection recess 24 forms an alternative output that is linked with the internal flow paths in the valve block 18 so that it is located in front of metering valve 14 in the direction of the flow. That would mean that using connection recess 24 with another connection would make a fluid regulator possible with the full flow without feeding via metering valve 14.

Figure 3:
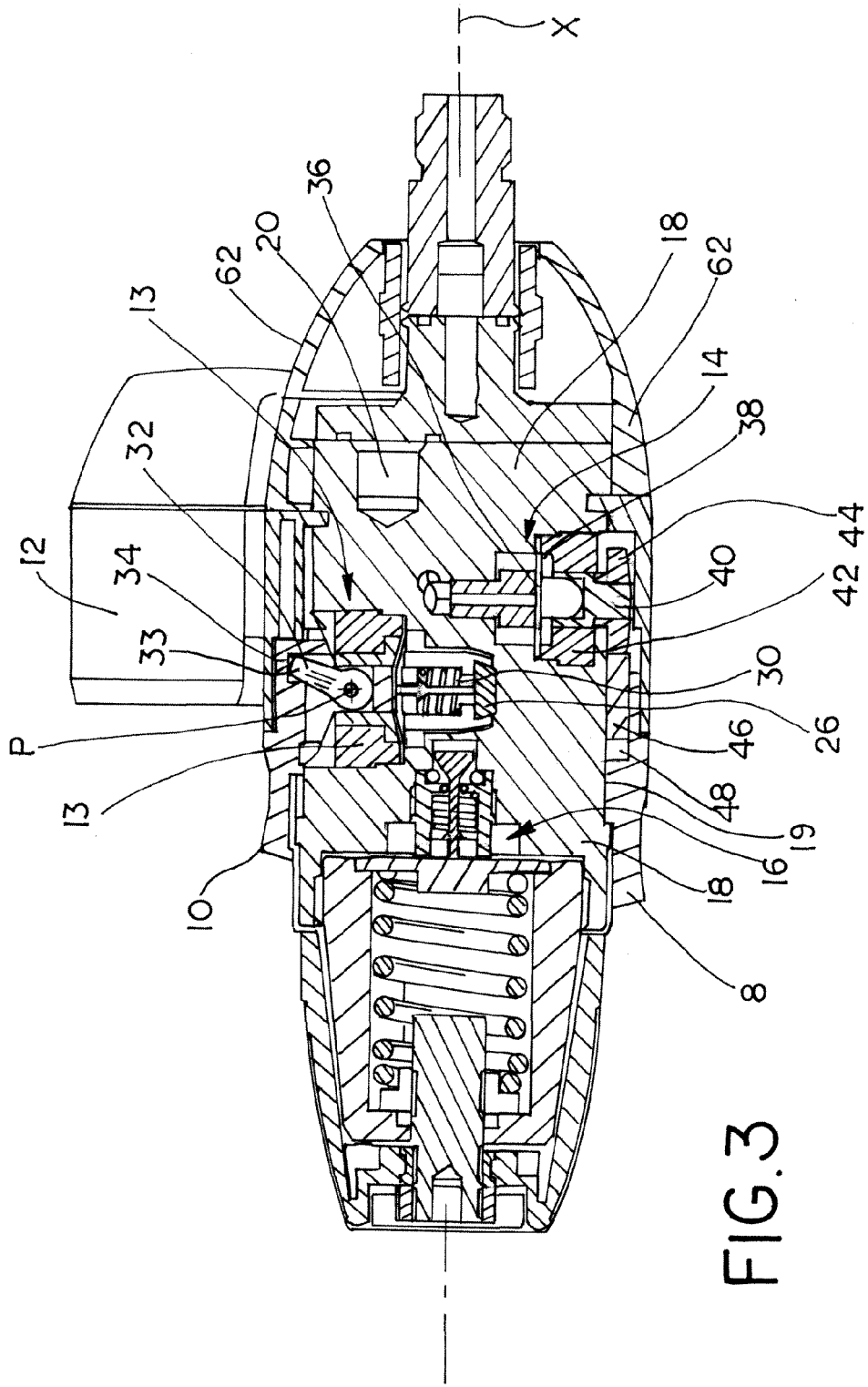
FIG. 3 is a cross-sectional view taken along line III-III of FIG. 2.
Figure 5:
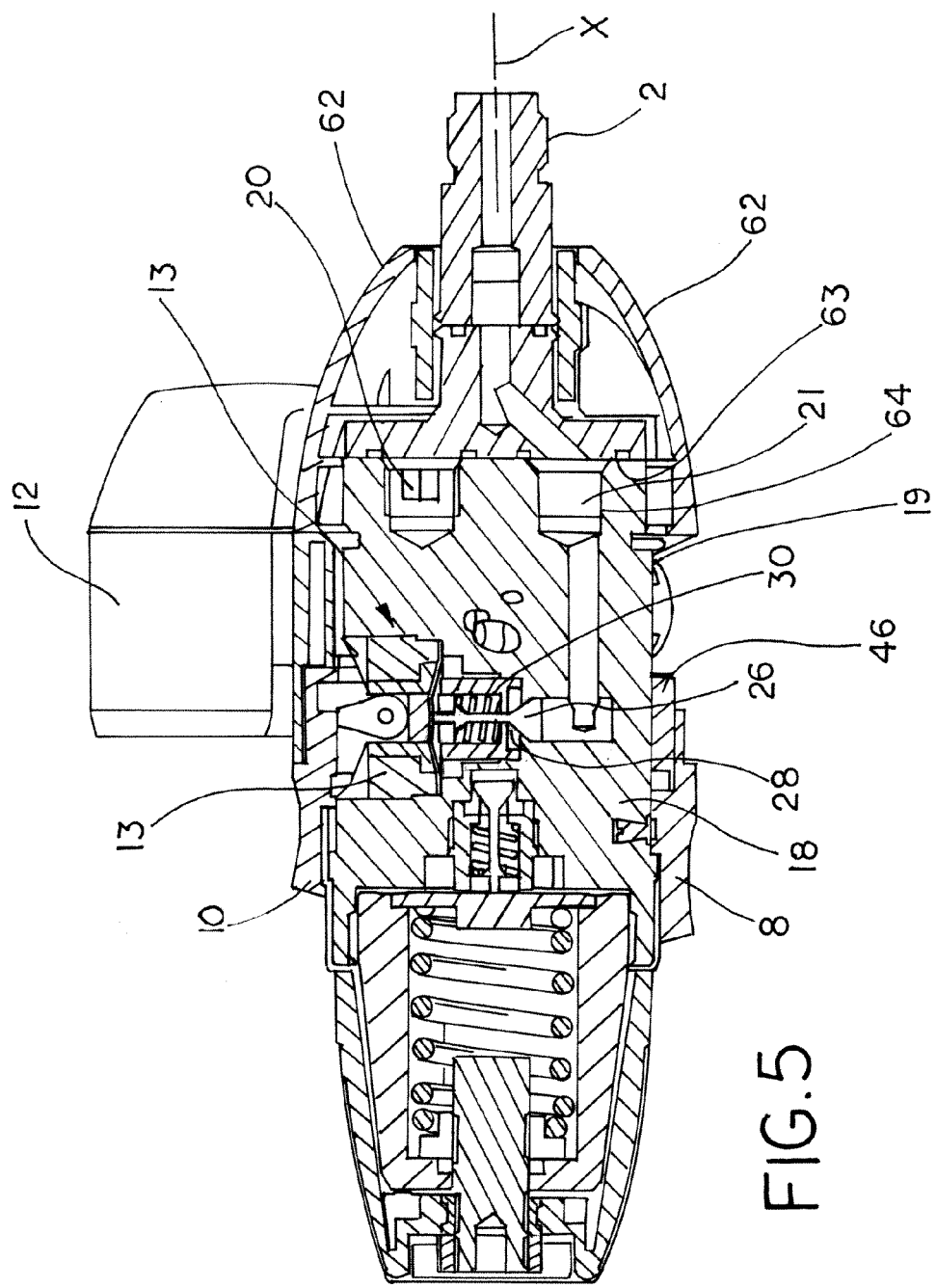
FIG. 5 is a cross-sectional view taken along line V-V of FIG. 2
Figure 6:
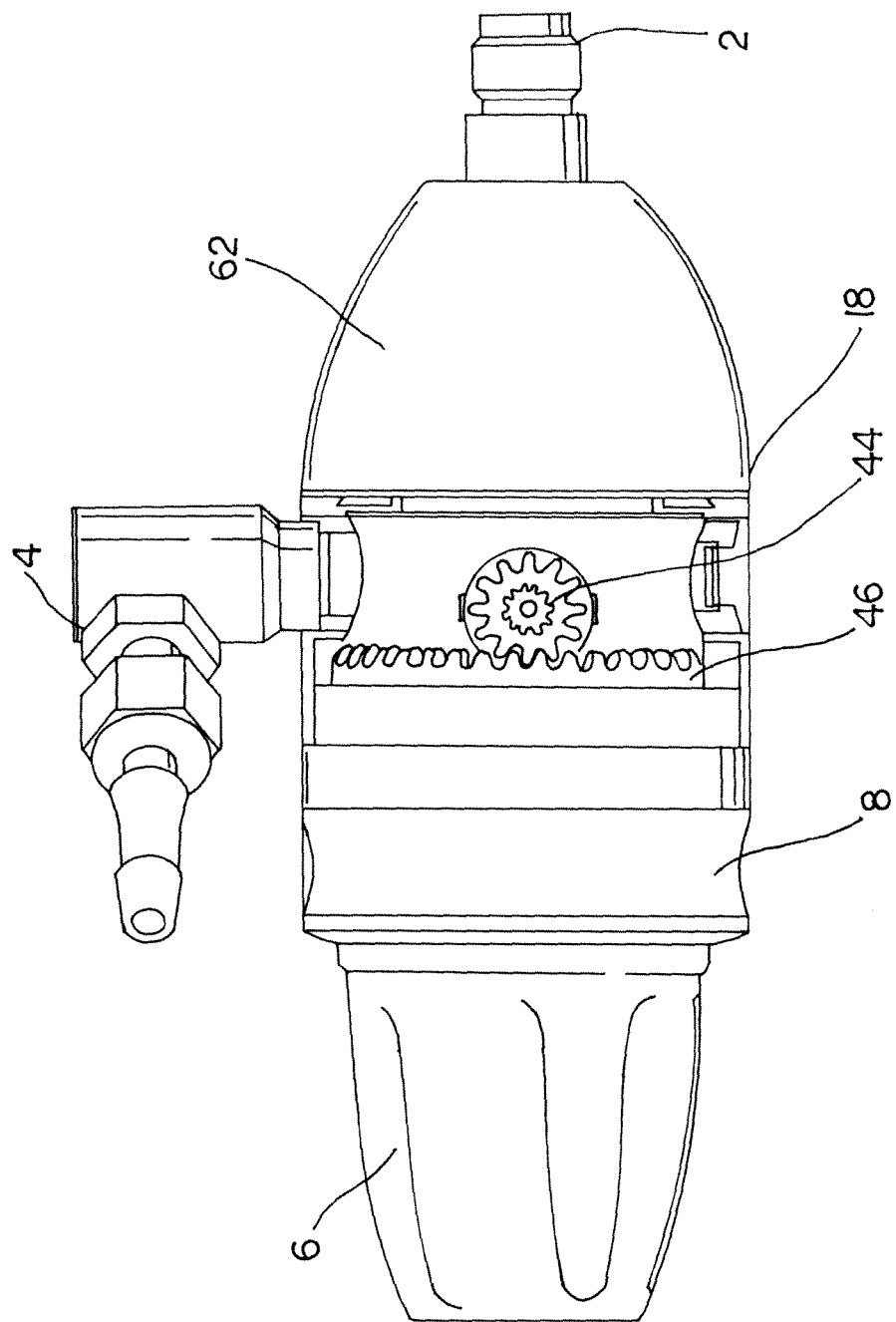
FIG. 6 is a bottom plan view of the fluid regulator of the foregoing Figures and showing apart of the rotation ring removed to reveal a portion of the tooth rack for operating the metering valve.
Figure 7:
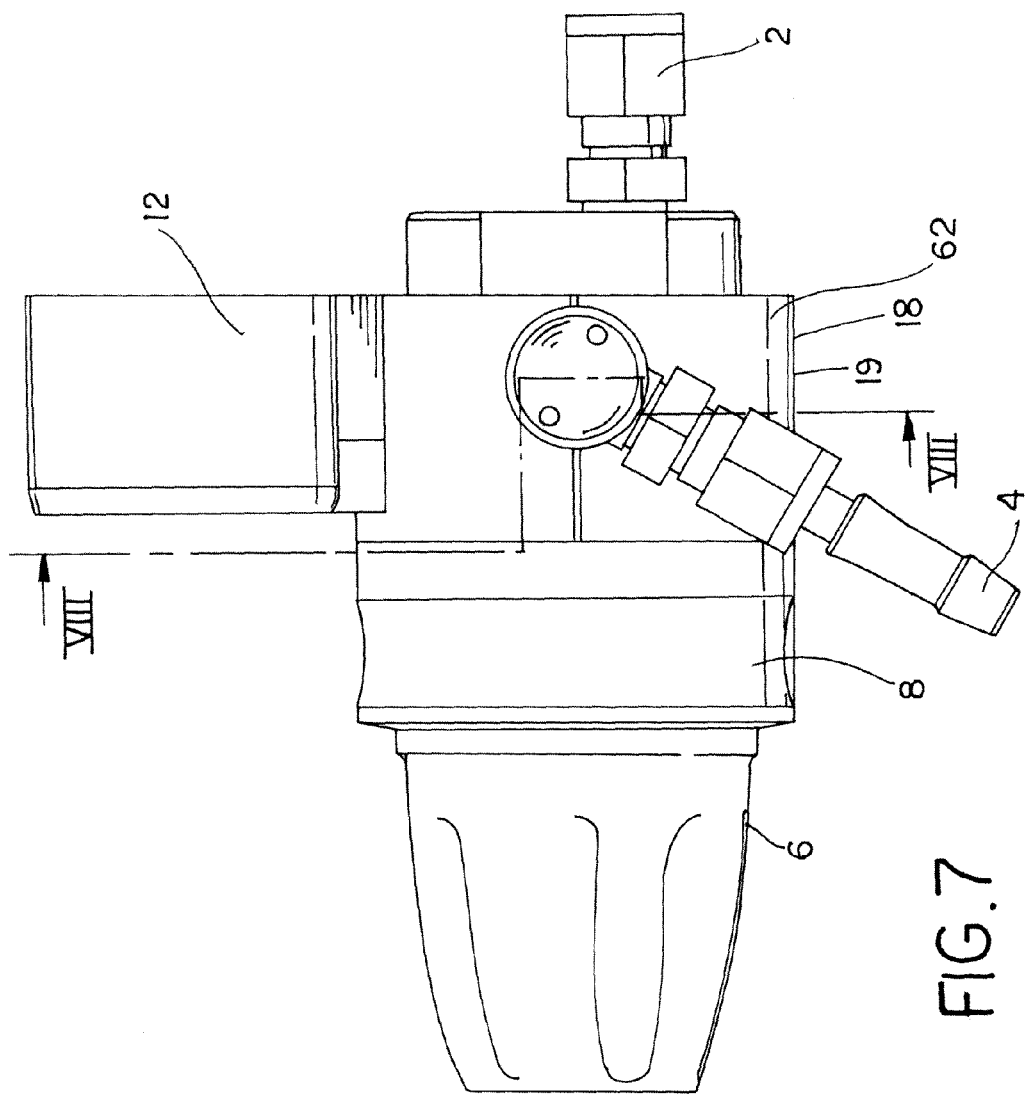
FIG. 7 is a side elevational view of the fluid regulator.

As shown in FIGS. 3 and 5, the shut-off valve 13 is formed as a piston valve with a piston 26 that can be moved in the axial direction. The piston 26 in the closed position acts as a seal to the system on a valve seat 28. The piston 26 is pretensioned with a pressure spring 30 in the closing direction. The shutoff valve 13 is opened by swiveling a rocker 32 around a swiveling axis P that extends normally to the axis of motion of the piston 26. The piston has a cam or eccentricity formed so that the piston is not pressed against the spring in the closing position. Its eccentricity or cam presses the piston against the spring in the open position so that the piston is lifted from valve seat 28 and the passage is opened. The rocker 32 includes a free end 33, and the sliding element 10 meshes with the free end 33 of the rocker 32 through a groove 34 formed in the sliding element 10, such that the rocker 32 is swiveled around its swiveling axis P by moving the sliding element 10. The groove 34 may extend in the circumferential direction around longitudinal axis X so that the end 33 of the rocker 32 slides in the groove 34 when the sliding element 10 is rotated together with rotation ring 8.

Figure 4:
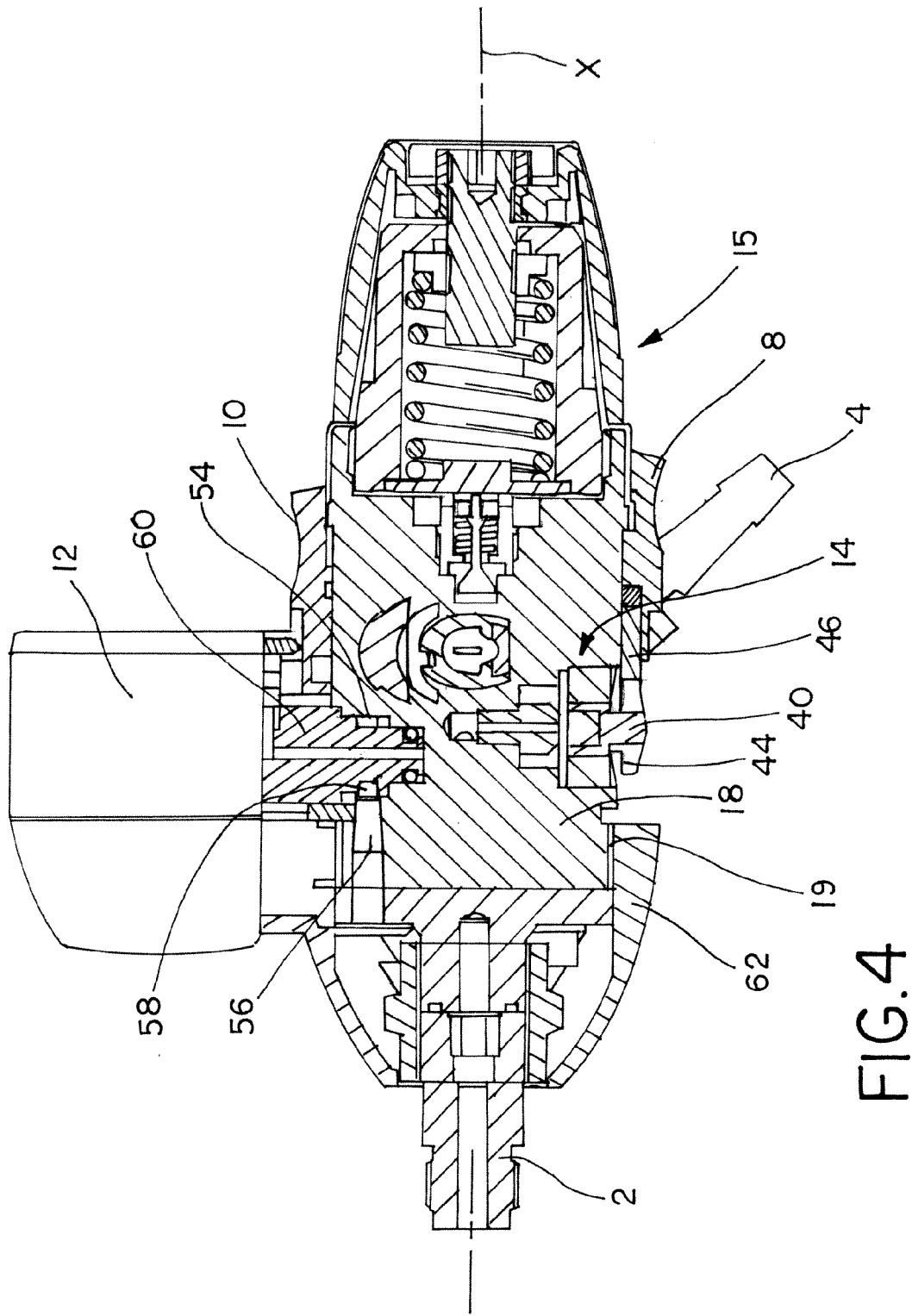
FIG. 4 is a cross-sectional view taken along line IV-IV of FIG. 2.

As shown in FIGS. 3 and 4, the metering valve 14 is formed as a membrane valve where one membrane 36 can be moved in relation to a valve seat 38. The movement of the membrane is initiated by valve or threaded spindle 40 that is mounted in a threaded receptacle 42. In other words, by rotating threaded spindle 40 around its longitudinal axis, it is simultaneously moved in the axial direction due to the thread through which the membrane is moved onto valve seat 38 to or away from it, depending on the direction of rotation. Threaded spindle 40 extends in the radial direction outwards over the exterior contour of the valve block 18. The gear 44, which may be formed as a bevel wheel, is mounted on the free end of threaded spindle 40 extending in the radial direction outwards. The gear 44 meshes with the curved toothed rack 46 which is mounted in the rotation ring 8 as discussed above. Alternatively, in the event the rotation ring 8 extends 360°, and the toothed rack 46 may likewise extend up to 360°. A spring element 48 is provided (visible in FIG. 3, but illustrated more completely in FIGS. 9-12), or several such spring elements 48 may be provided, between the rotation ring 8 and the toothed rack 46. The spring elements 48 press the toothed rack 46 against the gear as discussed in more detail in the discussion of FIGS. 9-12. Therefore, the gear 44 is rotated via the toothed rack 46 by rotating the rotation ring 8, such that the metering valve 14 is opened or closed depending upon the direction of rotation.

Figure 8:
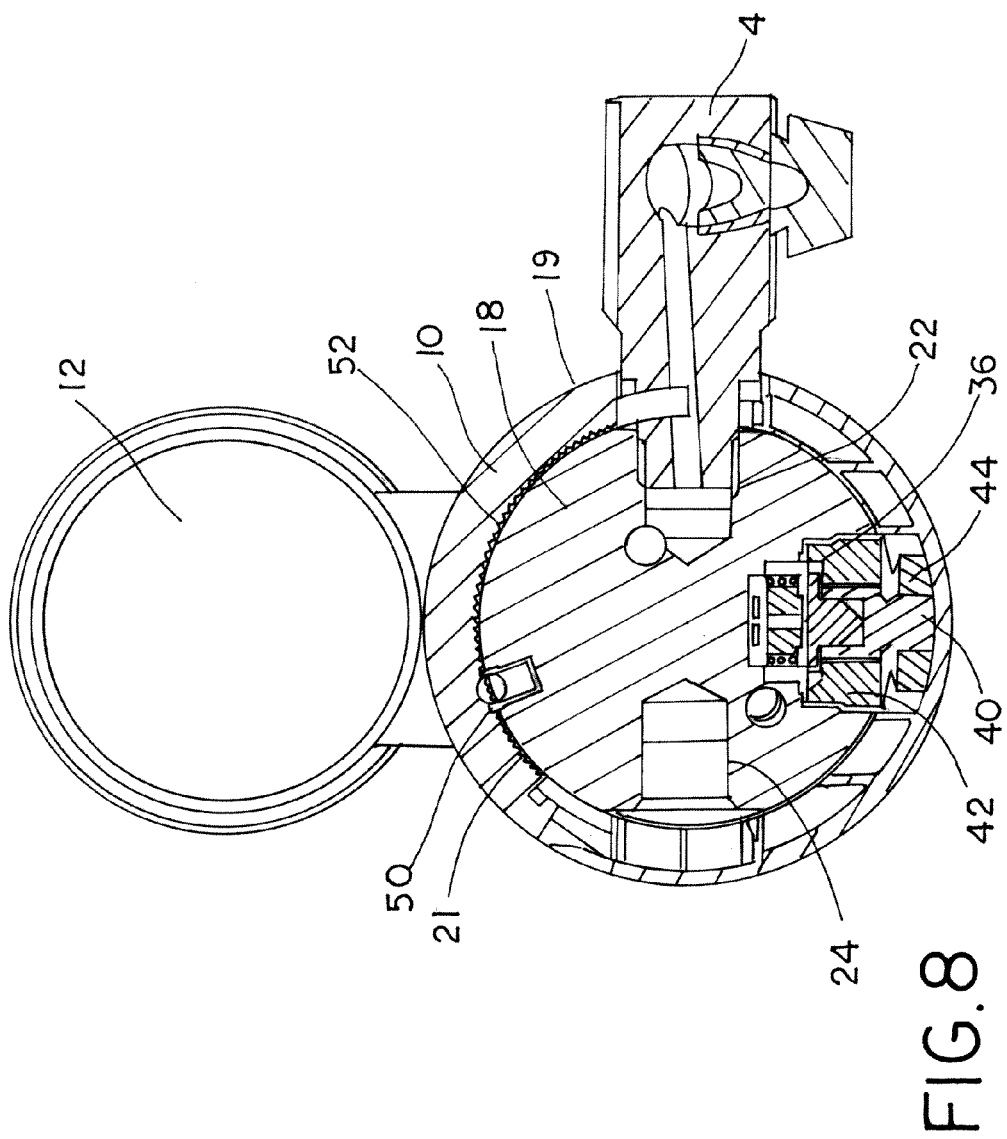
FIG. 8 is a cross-sectional view taken along line VIII-VIII of FIG. 7.

A notch may be provided adjacent the rotational interface between the ring 8 and a portion of the valve block 18, with the notch cooperating with notch elements such as spring biased ball elements 50 (see FIG. 8). The elements 50 provide for sensitive adjustment generated by the elements 50 arranged on the exterior circumference of valve block 18 and the ribs 52 on the inside circumference of the rotation ring 8 and/or on the sliding element 10. Preferably one or more ball notch elements 50 are provided and, if a plurality are used, the elements may be evenly distributed over the exterior circumference of valve block 18 to ensure symmetric exertion of force against the rotation ring 8. Those of skill in the art will readily understand the construction and operation of the pressure regulator 16, and therefore a more detailed description is not required.

As can be seen in FIG. 4, a pressure gauge 12 is inserted in a recess or blind hole 54 on the exterior circumference of valve block 18. It is locked there with a grub screw 56 that meshes in a groove 58 at connecting projection 60 of the pressure gauge 12. Recess 54 is linked with the flow path of pressure regulator 16 on the output side so that its output pressure is shown by the pressure gauge 12.

Valve block 18 is surrounded outwards by a housing 62 made of plastic that is formed in the example shown in several components for production engineering and assembly reasons. Housing 62 not only surrounds the valve block, but also pressure gauge 12 so that it closes off the entire fluid regulator to the outside world and defines the outside shape or form of the fluid regulator. Housing 62 can also cover unused openings or connections to the outside world. Removable stops can be provided in housing 62 or it is also possible to provide various housings, depending on which connections are supposed to be used on valve block 18. Surrounding housing 62 made of plastic allows an appealing exterior design for the entire fluid regulator.

The connections formed in valve block 18 or the outputs and inputs are preferably formed so that they are suitable both for sealing with an O-ring and sealing by means of threads. For example, this is described using connecting recess 21 in FIG. 5 that is provided for linking with connection 2 as an input. Connection recess 21 is formed so that it has seat 63 for an O-ring on its open exterior side and threads 64 on the inside. In the example shown, thread 64 is not used and it is sealed with an O-ring at seat 63. However, it is possible to screw connection 2 directly into thread 64 of connection recess 21 past as shown in the view in FIG. 7. Then there it is sealed by thread 64.

Figure 13:
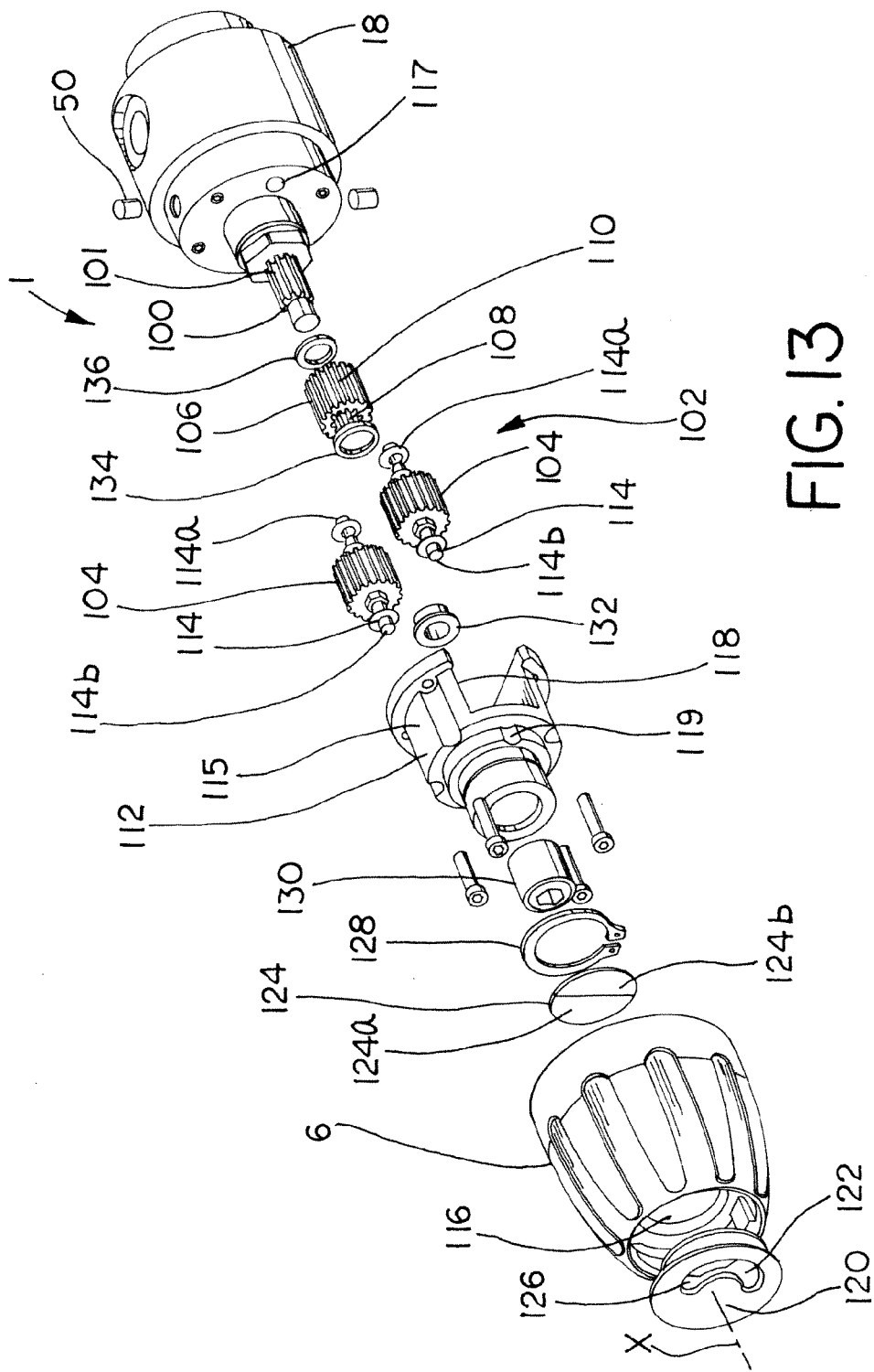
FIG. 13 is an exploded fragmentary view in perspective of a fluid regulator having a control mechanism assembled in accordance with the teachings of another disclosed example of the present invention.
Figure 16:
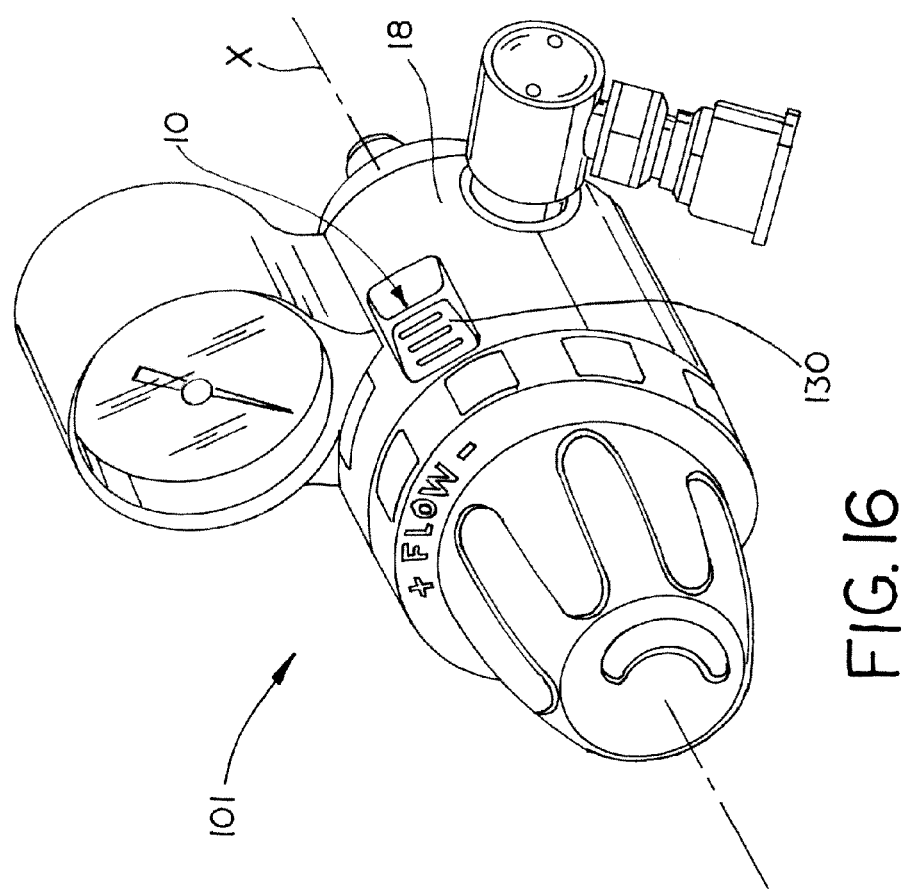
FIG. 16 is a perspective view of a fluid regulator assembled in accordance with the teachings of a further disclosed example of the present invention.
Figure 17:
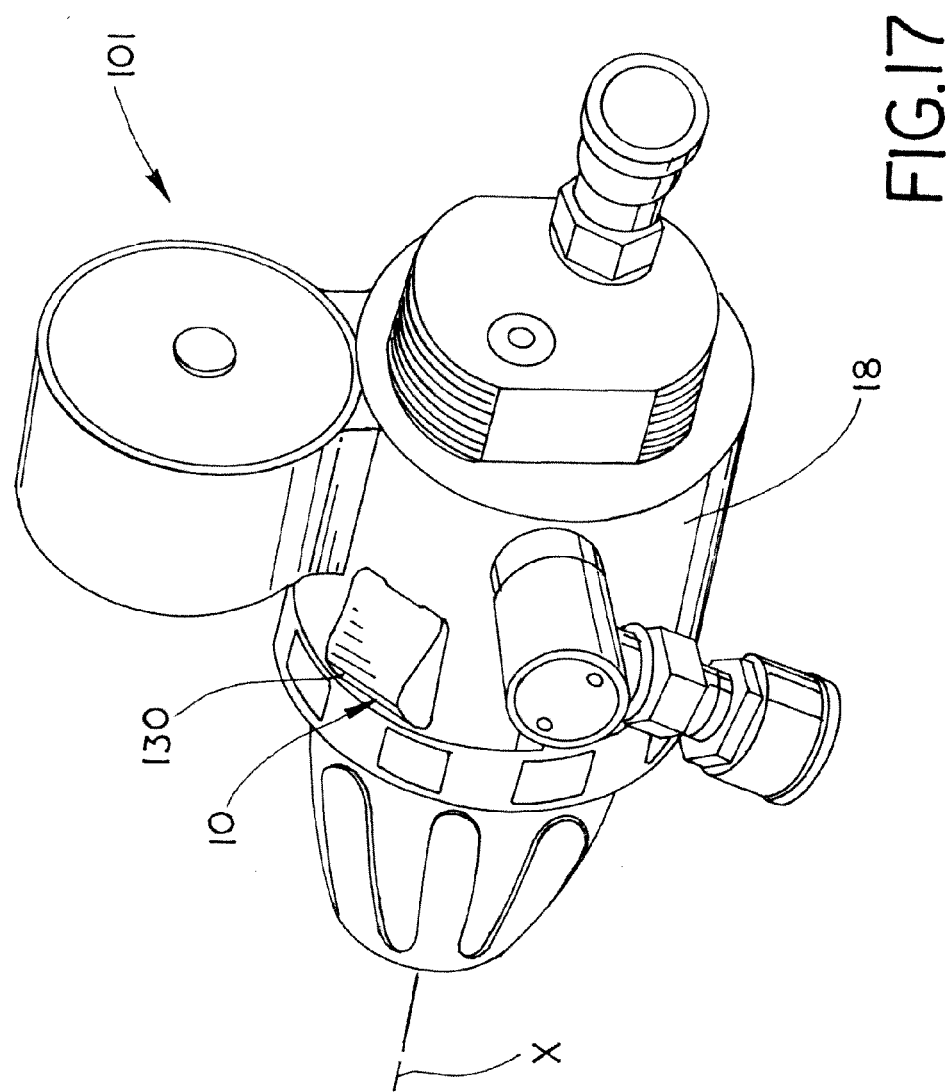
FIG. 17 is another perspective view of the fluid regulator of FIG. 16.
Figure 18:
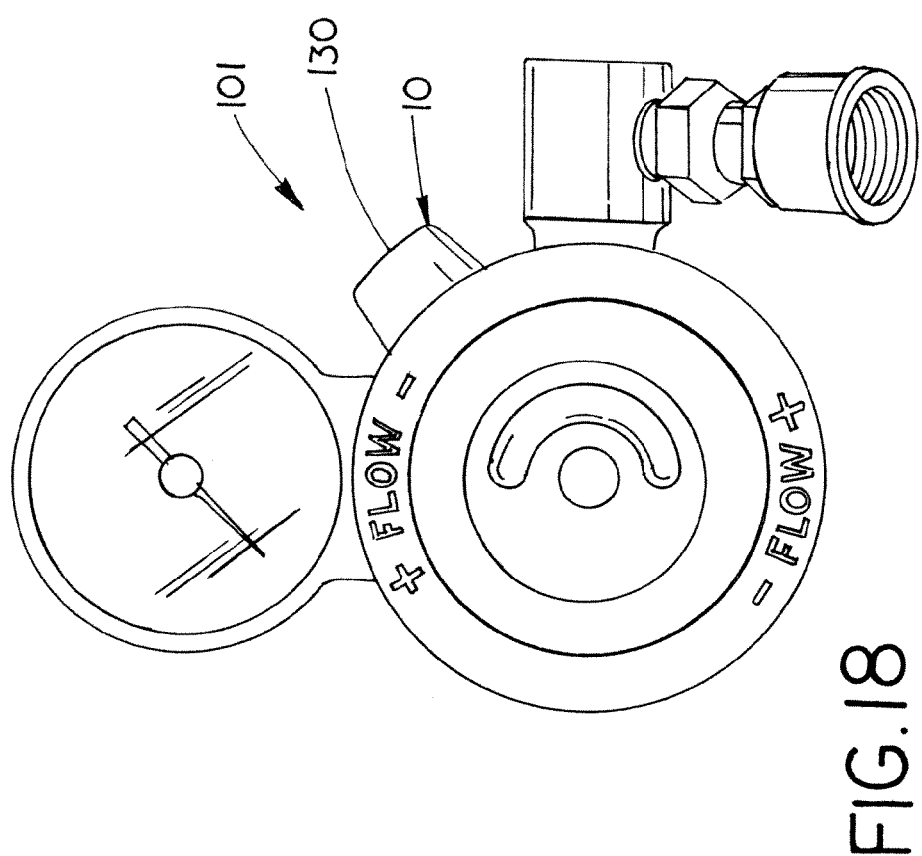
FIG. 18 is a front elevational view thereof.

Referring now to FIGS. 13-15, another exemplary embodiment for the fluid regulator 1 is shown. Except as outlined herein, the details of the fluid regulator 1 may be substantially the same or similar to the details of the device discussed above with respect to the first disclosed example. In the example of FIGS. 13-15, the pressure regulator 16 includes a control rod 100 which protrudes from the valve block 18. It will be understood that the control rod 100 controls the operation of the pressure regulator 16, and further that the control rod 100 rotates about the axis X in response to rotation of the handwheel 6 about the same axis X. Further, it will be understood that the control rod 100, in the disclosed example, translates along the axis X as the rod 100 rotates about the same axis. In the example shown, the handwheel 6 is operatively coupled to the control rod 100 by a gear assembly 102. The gear assembly 102 includes outer gears 104 and a sliding gear 106. The sliding gear 106 includes inner cogs 108 which mesh with corresponding cogs 101 on the control rod 100. The sliding gear 106 also includes outer cogs 110 which mesh with the outer gears 104. Consequently, rotation of the outer gears 104 cause a corresponding rotation of the sliding gear 106, which in turn causes rotation of the control rod 100. Further, the sliding gear 106 slides relative to the control rod 100 as the control rod 100 translates along the axis X.

The gear assembly 102 preferably includes an inner housing 112. The outer gears 104 may be rotationally mounted between the valve block 18 and a housing 112. In the example shown, the outer gears 104 include shafts 114 which have one end 114a engaging the valve block 18 and another end 114b engaging the housing 112. Suitable mounting apertures 117 may be provided in the valve block 18, with corresponding mounting apertures 119 provided in the housing 112.

The handwheel 6 includes an inner gear 116 which engages the outer gears 104 of the gear assembly 102. Preferably, the housing 112 includes a sidewall 115 having side apertures 118 which permit the gear 116 to engage the outer gears 104. In the example shown, a pair of outer gears 104 are provided, although more than two outer gears may be used. Appropriate bushings may be used throughout, including the bushings 130, 132, 134 and 136. The valve block 18 may include ball elements 50 of the type discussed above suitably positioned at the rotational interface between the valve block 18 and the handwheel 6.

In the example of FIGS. 13-15, the handwheel 6 includes an end face 120 having a viewing aperture 122. Preferably, a background disk 124 is mounted inside the handwheel 6 such as by mounting the disk 124 to the housing 112. The disk 124 preferably includes a visual indication which, in the disclosed example is provided by having a pair of areas 124a and 124b. The areas preferably are color-coded to provide one color such as green to indicate the on condition of the fluid regulator 1 and another color such as red to indicate the off condition of the fluid regulator 1. Still other colors may be used, and other forms of visual indication may prove suitable, such as text, icons, or other graphical indications of the on-off state of the fluid regulator 1. Further, in the disclosed example, the viewing aperture 122 comprises an arcuate slot 126. The disk 124 may be secured in place with a C-clip 128.

In accordance with the example of FIGS. 13-15, the arrangement of the gear assembly 102 provides a balanced and compact mechanism. For example, the symmetric arrangement of the outer gears 104 relative to the control rod 100 engages the control rod 100 from both sides such that the control rod 100 does not experience any bending moment. In the event additional outer gears 104 are provided, the gears again may be arranged in a balanced or symmetrical fashion such that the control ride 100 does not experience any moment.

Referring now to FIGS. 16-21, a further disclosed example for the fluid regulator is shown and is referred to by the reference numeral 101. In the embodiment of FIGS. 16-21 the on-off control or sliding element 10 takes the form of an external control button 130. The control button 130 protrudes through the outer cylindrical wall 19 of the valve block 18 through a suitably sized slot or aperture 132 visible in FIG. 20. Referring to FIG. 20, the button 130 is coupled to a corresponding component 134 slidably mounted within the fluid regulator 101. The component 134 includes a suitable notch or groove 34 which engages the end 33 of the rocker 32. Accordingly, by sliding the button 130 back and forth in a direction parallel to the axis X, a user can manipulate the on-off valve 13 by shifting the rocker 32 back-and-forth about its pivot axis P similar to the on off actuation discussed above with respect to the first disclosed example.

Referring to FIG. 21, the button 130 is coupled to an indicator panel 136 which is visible through a viewing window 138 formed in the surrounding side wall 19 of the regulator 101. The indicator panel 136 preferably includes a visual indication which, in the disclosed example is provided by having a pair of areas 136a and 136b. The areas preferably are color-coded to provide one color such as green to indicate the on condition of the regulator 101 and another color such as red to indicate the off condition of the regulator 101. Still other colors may be used, and other forms of visual indication may prove suitable, such as text, icons, or other graphical indications of the on-off state of the regulator 101. In the example shown, the area 136a includes the "ON" text while the area 136b includes the "OFF" text.

In accordance with one or more aspects of the disclosed example or examples, a fluid regulator assembled in accordance with the teachings discussed herein may provide any contact set up that is easy to assemble, while reducing the danger of leaks between each of the individual components of the fluid regulator.

One or more aspects of fluid regulator may include, for example, a combination of a pressure regulator and a metering valve. The pressure regulator may be used for adjusting the pressure of the gas to be extracted while the metering valve may be used for adjusting the flow rate. Both elements may be connected in series in the flow path where the metering valve is preferably mounted downstream of the pressure regulator, i.e. on the output side of the pressure regulator. The pressure regulator and the metering valve preferably are integrated into one joint valve block. In other words, the pressure regulator and metering valve preferably form one integrated component part. This construction may, in accordance with the disclosed examples, provide a benefit in that the device can be set up compactly and it may not be necessary to connect two component parts (i.e., the pressure regulator and metering valve) for forming the fluid regulator. In accordance their width, the risk of leaks can be minimized or avoided by not linking these control elements together, but instead integrating them into a single joint or integrated valve block. Additionally, the compact structure disclosed herein also may make it possible to accord a more modern and appealing design to the device. Furthermore, this allows for more clearly structured design that also makes it easier for the user to operate. Finally, integrating the metering valve and pressure regulator into one valve block also allows a clearly structured arrangement of each of the operating elements of the pressure regulator and metering valve that is easy to handle.

As a preferred design form, a shut-off valve is also built into the valve block that has the function of completely blocking off the gas feed. This is preferred when the metering valve is not formed for completely blocking off the gas feed so that always allows minimum flow rate. The shut-off valve is preferably mounted before the pressure regulator in the direction of flow, i.e. on the input side of the pressure regulator. However, it is also possible to mount the shut-off valve on the output side of the pressure regulator, for instance in the flow path between the pressure regulator and metering valve or also downstream of the metering valve. Here, the shut-off valve forms an integrated component part with the metering valve and pressure regulator in the joint valve block that allows a compact design for the entire fluid regulator and beyond this a way to clearly structure the arrangement of the operating elements. Additionally, there is an option of mounting all of the operating elements in proximity to one another allowing one-hand operation without having to put a lot of effort in moving around the fluid regulator.

Another preferred option is mounting a pressure gauge on the valve block. A pressure gauge such as this can be built directly into the valve block so that a display device is placed on one of the outsides or on the surface of the valve block. An alternative would be forming a connection in the valve block that the pressure gauge is mounted on so that it projects out of the valve block with its indicating element. Furthermore, the valve block can be enclosed with a casing or housing that encases the fluid regulator to the outside world. If a housing such as this is provided, the pressure gauge (even if it is mounted on the outside of the valve block) can be built into a joint surrounding housing together with the valve block. While the valve block is preferably made of metal, the housing can be formed of plastic as an injection moulding component which allows a variety of different forms.

It is expedient to form connecting channels in the valve block to link the pressure regulator and metering valve and possibly also the shut-off valve and/or a pressure gauge. In other words, all needed links or flow paths are preferred from the input of the fluid regulator (that is provided to connect up to such things as a central gas supply) to the output that the units to be supplied with gas can be connected to formed on the inside of the valve block. This would eliminate any additional line connections between any of the elements in the valve block (such as the pressure regulator, metering valve and possibly the pressure gauge and/or the shut-off valve) that would increase the effort for assembly and the danger of leaks. All of the connections or flow paths can preferably be formed as channels or holes that might be produced as drillholes inside of the valve block.

A particularly preferred option its forming the valve block out of one piece. This would make it possible to produce the valve block out of one metallic component. The receptacles needed for the pressure regulator, metering valve and/or shut-off valve and/or pressure gauge as well as the connecting channels and connections needed could be brought into a metallic component such as this either by metal removing processes or in some other suitable fashion. Receptacles opened in the valve block (preferably to the surface of the valve block) will be formed as holes or recesses for the pressure regulator and the valves (i.e., the shut-off valves and metering valves) that the aforementioned elements are inserted into. The connecting channels inside of the valve block flow into these receptacles. The necessary valve seats can also be directly formed in these receptacles or the valve seats could be inserted into the receptacles as separate components.

A preferred design form mounts the pressure regulator at a first face of the valve block. This is preferably the face pointing to the front when the fluid regulator is installed (i.e., facing the operating personnel). This would mean that a handwheel could be mounted on the front side of the fluid regulator for operating the pressure regulator. Preferably, the valve block is essentially formed cylindrically and the axis of rotation for the handwheel extends along the longitudinal axis of the valve block. The valve block preferably has an exterior diameter that is essentially identical to the exterior diameter of the handwheel of the pressure regulator so that the fluid regulator can have a compact design and integral appearance.

The metering valve and/or the shut-off valve are preferably mounted on a circumferential surface of the valve block. That means that receptacles or recesses are formed in the valve block that are opened towards these circumferential surface and that the valves are inserted into. Preferably, these valves essentially do not project over the circumferential surface of the valve block, rather only operating elements for these valves. The circumferential surface that the valves (i.e., the metering valves and possibly the shut-off valves) are mounted in is preferably a circumferential surface that normally extends to the face that the pressure regulator is mounted on. Preferably, this is an essentially cylindrical circumferential surface.

Furthermore, at least one gas input and one gas output are mounted on a second face of the valve block and/or on the circumference surface. The second face is preferably the face that is arranged to be turned away from the first face that the pressure regulator is mounted on. This is the rear face of the fluid regulator when installed. It is possible to form alternative gas inputs and/or outputs on the valve block. For instance, a rear gas output could be provided on the face and a circumferential gas output code could be provided on the circumferential surface that can be alternately connected. The gas output not used can be sealed with a screw or blind plug. Logically, a gas input can also be provided on the second face along with a circumferential gas input that can be alternately used to provide different connecting or installing systems with one and the same fluid regulator or one and the same valve block. The gas input not used can be sealed with a sealing screw or blind plug. Beyond this, it is possible to arrange several gas inputs and/or several gas outputs providing the option of circumventing specific components such as the shut-off or metering valve in the valve block. For example, two gas outputs could be provided, one of which is mounted in front of the metering valve and one of which is mounted behind the metering valve in the flow direction. This would make it possible to alternately take the full flow rate without having the effect of the metering valve in addition to the flow rate from the fluid regulator that is reduced by the metering valve.

Preferably, a rotation ring surrounding the circumference of the valve block is mounted for operating the metering valve that can be rotated about the longitudinal axis of the valve block. In the event that the valve block is covered by a housing surrounding it, this rotation ring is preferably inserted into the surface of the housing or its surrounds the surface of the housing circumferentially. A rotation ring that circumferentially surrounds the entire valve block or the entire fluid regulator can be accessed very well. Furthermore, a rotation ring of this size allows precise feeding operation with a comparably small angle of rotation since a large rotation ring can be adjusted very sensitively even over a small angle of rotation. This makes it possible to design it so that the regulating distance is less than 360° for the rotation ring to operate the metering valve and preferably less than 180°. In other words, sensitive feeding operation is possible without encompassing it. Beyond this, the rotation ring can have notches for giving the operator greater sensitivity when adjusting the metering valve. This means that each of the notches can correspond to defined changes in flow rate. The graduated notches are preferably very small to allow precise and sensitive feeding operation.

The rotation rate preferably has toothed wheel works that mesh with a gear of a valve spindle of the metering valve where preferably the longitudinal axis of the valve spindle extends normally to the longitudinal axis of the valve block. The valve spindle is preferably inserted together with the other elements of the metering valve in particular, a valve seat in a recess or drillhole that extends radially from the circumferential surface into the inside of the valve block. The valve spindle runs in a thread so that the rotational movement of the valve spindle is transformed into a lifting movement for opening and closing the valve. Preferably, one end of the valve spindle projects slightly over the external circumference of the valve block so that a gear is formed or can be arranged there. The toothed wheel works of the rotation ring rotates the gear when it rotates which also rotates the valve spindle. The longitudinal axis of the rotation ring and the valve spindle are arranged normally to one another. The toothed wheel works on the rotation ring do not have to extend over the entire circumference of the rotation ring if the setting range of the rotation ring is less than 360°. The toothed wheel works are preferably mounted so that the teeth of the toothed wheel works extend parallel to the circumferential surface of the valve block, i.e. concentric to the rotation axis of the rotation ring on a cylinder jacket surface. The toothed wheel works of the gear are correspondingly formed as front toothed wheel works. An alternative would also be coupling them like bevel wheel works. This design would make it possible to lodge the valve spindle in a thread so that it would not be the valve spindle that would be moving in any axial direction, but a second element meshing with the threads of a valve spindle that would then open and close the valve by means of axial motion.

Another preferable option is arranging the rotation ring concentrically in relation to the handwheel for the pressure regulator. Here, the rotation ring and the handwheel of the pressure regulator can preferably rotate around the same rotational axis, i.e. furthermore preferably around the longitudinal axis of the valve block. This would allow a very compact design for the entire fluid regulator. Preferably, the rotation ring is arranged offset to the handwheel of the pressure regulator in the axial direction along the rotational axis. Here, the rotation ring is preferably axial behind the handwheel of the pressure regulator or on its axial end from the perspective of the first face. Beyond this, both components preferably connect directly to one another or the rotation ring circumferentially covers the axial end of the handwheel for the pressure regulator which produces an external contour with few joints and an altogether harmonic exterior design for the pressure regulator.

A sliding element is preferably mounted or operating the shut-off valve that can be moved parallel to the longitudinal axis of the valve block, i.e. preferably parallel to the rotational axis of the rotation ring and/or a handwheel for a pressure regulator. The sliding element is preferably mounted directly on the exterior surface of the valve block or a housing surrounding the valve block so that it can also be harmoniously integrated and preferably flush into the further design of the housing. An alternative is designing the sliding element so that it can be shifted in the circumferential direction and also formed in particular as a rotation ring.

The sliding element is especially preferred to be led linearly on a rotation ring for operating the metering valve parallel to the rotational axis of the rotation ring. In other words, the sliding element can be integrated into the basic shape or the exterior contour of the rotation ring so that all operating elements for the fluid regulator can be easily accessed and are next to one another. The sliding element can be formed or arranged in the rotation ring so that it can be rotated together with the rotation ring. It would be possible to simultaneously form the entire rotation ring as a sliding element so that it can not only carry out a rotational movement, but also an axial movement parallel to its rotational axis to operate the shut-off valve in this motion. Preferably, the sliding element would not extend over the entire circumference of the rotation ring, but only a partial segment of the circumference and would be able to move in the axial direction in the rotation ring.

Preferably, the shut-off valve itself is preferably operated via rocker mechanism that can preferably be operated via sliding element where the sliding element can be formed or arranged in the fashion described above. The rocker mechanism is used for carrying out an axial motion parallel to the longitudinal axis of the valve block or a motion in the circumferential direction in an axial movement normal to longitudinal axis. The shut-off valve itself is preferably arranged in a recess or a blind hole that extends in the radial direction to the longitudinal axis of the valve block from its circumferential surface. The motion for operating a valve element, for instance a piston or a membrane, is also preferably carried out in the radial direction. A rocker can bring about this motion if the sliding element is shifted outside of the exterior contour of the valve block and parallel to its longitudinal axis or in its circumferential direction and exerts a force on the rocker. Preferably, the shut-off valve or its operating element has notched positions corresponding to the open and close position of the shut-off valve. In addition, suitable notched elements (such as notched balls) could be provided. Beyond this, it is possible to form the rocker mechanism as an over-dead point mechanism that ensures that the rocker catches in its two final or switching positions.

As per another preferred design form, the rotation ring can be loaded with spring force for operating the metering valve in the axial direction which compresses the toothed wheel works of the rotation ring with the toothed wheel works of the gear on the valve spindle. This can eliminate the play from the gearbox gearing between the toothed wheel works and the gear making it possible to precisely adjust the metering valve via rotation ring.

The pressure gauge is preferably linked with the valve block as an attached pressure gauge. In other words, a connecting recess is formed in the valve block in the form of a blind hole that the pressure gauge is inserted in with a connecting element. The pressure gauge is safeguarded against falling out with a grub screw in a valve block where this grub screw preferably locks into a recess or groove on the connecting element of the pressure gauge. The connecting element and the recess on the valve block can be formed so that it is only possible to insert it in one specific angle position to automatically guarantee the correct alignment of the pressure gauge and valve block to one another in assembly.

The connections (i.e., the gas inputs and outputs on the valve block) are preferably formed to ensure that they both have a thread and a seat for an O-ring. This allows various ways to seal or interface them (on the one hand, just sealing with the threads or, on the other hand, with an O-ring if it is connected in some other fashion such as a clamping connection).

Various details of the foregoing embodiments may be combined with one another. Consequently, specific details of the various embodiments need not be considered as mutually exclusive. Further, the fluid regulator 1 may have one or more of the above-described internal control elements, and may have a corresponding number of external hand controls as required.

The preceding text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

The invention claimed is:

1. A fluid regulator comprising:
   a valve block having an inlet arranged for connection to a gas supply and an outlet arranged for connection to an item of gas equipment, the valve block further defining a flow path between the inlet and the outlet;
   the valve block housing a pressure regulator, a metering valve, and a shut-off valve, each of the pressure regulator, the metering valve, and the shut-off valve disposed in the flow path within the valve block;

a rotatable pinion operatively coupled to the metering valve for controlling the metering valve;

a hand control coupled to the valve block and rotatable about an axis;

a toothed rack movable with the hand control, the toothed rack formed in an arcuate shape, the toothed rack sized to engage the rotatable pinion; and a spring disposed between the hand control and the toothed rack, the spring arranged to bias the toothed rack in a direction parallel to the axis and into engagement with the pinion.

2. The fluid regulator of claim 1, wherein the hand control is arcuate and includes an internal bearing face disposed perpendicular to the axis, and wherein the spring bears against the internal face.

3. The fluid regulator of claim 1, wherein the toothed rack and the spring are sized to fit within a receiving area defined by the hand control.

4. The fluid regulator of claim 3, wherein the receiving area is arcuate and includes a pair of end faces and a bearing face, the bearing face oriented perpendicular to the axis, the spring positioned to bear against the bearing face.

5. The fluid regulator of claim 4, a plurality of springs.

6. The fluid regulator of claim 4, the toothed rack includes a pair of end faces, each end face of the toothed rack positioned adjacent a corresponding end face of the receiving area.

7. The fluid regulator of claim 1, wherein the hand control includes a bearing face, and including a pair of springs, each of the springs including a pair of legs positioned to bear against the bearing face of the hand control.

8. The fluid regulator of claim 7, wherein each of the springs includes a head disposed opposite the pair of legs, and wherein the toothed rack includes a notch for each of the springs, each notch sized to receive the shaped head of a corresponding one of the springs.

9. The fluid regulator of claim 8, wherein the shaped head of each of the springs spring includes a pair of laterally extending arms.

10. The fluid regulator of claim 1, wherein the hand control is arcuate and includes a wall sized to cover the toothed rack and the rotatable pinion.

11. The fluid regulator of claim 1, wherein the hand control is arcuate, and wherein the hand control and the valve block meet along a rotational interface having a corrugated surface, and further including a plurality of spring biased balls disposed adjacent the interface and sized to engage the corrugated surface.

12. The fluid regulator of claim 11, wherein the corrugated surface is formed on an inwardly facing surface of the hand control.

13. A fluid regulator comprising:

a valve block having an inlet arranged for connection to a gas supply and an outlet arranged for connection to an item of gas equipment, the valve block further defining a flow path between the inlet and the outlet;

the valve block housing at least one internally mounted control component disposed in the flow path, the control component for controlling an operational parameter of gas from the gas supply, the operational parameter comprising at least one of gas pressure, gas flow, or on-off state;

a rotatable pinion operatively coupled to the control component;

a hand control coupled to the valve block and rotatable about an axis;

a toothed rack movable with the hand control, the toothed rack formed in an arcuate shape, the toothed rack sized to engage the rotatable pinion; and a spring system disposed between the hand control and the toothed rack, the spring system arranged to bias the toothed rack in a direction parallel to the axis and into engagement with the pinion.

14. The fluid regulator of claim 13, wherein the hand control is arcuate and includes an internal bearing face disposed perpendicular to the axis, and wherein the spring assembly comprises legs positioned to bear against the internal face.

15. The fluid regulator of claim 14, wherein the toothed rack is disposed in an in internal arcuate receiving area of the hand control.

16. The fluid regulator of claim 13, wherein the spring assembly comprises a pair of springs, each of the springs including a head disposed opposite the pair of legs, the head of each spring sized to engage a corresponding shaped notch in the toothed rack.

17. The fluid regulator of claim 13, wherein the hand control is arcuate, and wherein the hand control and the valve block meet along a rotational interface including a corrugated surface carried by the hand control, and further including a plurality of spring biased balls mounted to the valve block and positioned to engage the corrugated surface.

18. A fluid regulator having a handwheel actuator and comprising:

a valve block having an inlet arranged for connection to a gas supply and an outlet arranged for connection to an item of gas equipment, the valve block further defining a flow path between the inlet and the outlet;

the valve block housing at least one internally mounted control component disposed in the flow path, the control component for controlling an operational parameter of gas from the gas supply, the operational parameter comprising at least one of gas pressure, gas flow, or on-off state;

a control rod operatively coupled to the control component and rotatable about an axis, the control rod including a gear and arranged to control the operational parameter, the control rod further arranged to translate along the axis in response to rotation about the axis;

a gear assembly mounted adjacent the valve block, the gear assembly comprising a plurality of gears positioned about the control rod and in operative engagement with the gear of the control rod;

a rotatable handwheel operatively coupled to the valve block and rotatable about the axis, a handwheel having an internal gear positioned to engage the gear assembly; and wherein the gear assembly operatively couples the handwheel to the control rod to permit rotation and translation of the control rod in response to rotation of the handwheel.

19. The fluid regulator of claim 18, including a housing mounted to the valve block, the plurality of gears mounted inside the housing.

20. The fluid regulator of claim 19, wherein the housing includes a side wall having a plurality of apertures, each of the apertures sized to expose the corresponding one of the plurality of gears to the internal gear of the handwheel.

21. The fluid regulator of claim 18, wherein the handwheel and the valve block meet along a rotational interface, and including a spring biased element and a corresponding detent carried by cooperating portions of the handwheel and the valve block at the rotational interface.

22. The fluid regulator of claim 18, wherein the handwheel and the valve block meet along a rotational interface, and including a spring biased element mounted to the valve block and a corrugated surface on an inner portion of the handwheel adjacent the rotational interlace.

23. The fluid regulator of claim 18, wherein the control component is a pressure regulator.

24. The fluid regulator of claim 18, wherein the handwheel includes a viewing aperture, and including background disk mounted inside the handwheel and rotationally fixed relative to the valve block, the background disk positioned to be viewable through the viewing aperture and arranged to provide a visual indication of the operational parameter.

25. The fluid regulator of claim 24, wherein the viewing aperture comprises an arcuate slot, and wherein the background disk is secured by a C-clip.

26. The fluid regulator of claim 18, wherein the gear assembly comprises outer gears rotatably mounted relative to the valve block and in engagement with a sliding gear, the sliding gear having outer cogs in engagement with the outer gears and inner cogs in engagement with cogs on the control rod.

27. The fluid regulator of claim 18, including a housing mounted to the valve block and beneath the handwheel, the gear assembly including outer gears rotatably mounted between the housing and the valve block, the outer gears positioned to engage the internal gear on the handwheel.

28. A fluid regulator having a handwheel actuator and comprising:
a valve block having an inlet arranged for connection to a gas supply and an outlet arranged for connection to an item of gas equipment, the valve block further defining a flow path between the inlet and the outlet;
the valve block housing a plurality of internally mounted control components disposed in the flow path, each of the control components arranged to control an operational parameter of gas from the gas supply, the operational parameter comprising gas pressure, gas flow, or on-off state;
a control rod protruding from the valve block and operatively coupled to a selected one of the control components and rotatable about an axis, the control rod including
a gear and arranged to control the operational parameter associated with the selected control component, the control rod further arranged to translate along the axis in response to rotation about the axis;
a gear assembly mounted adjacent the valve block, the gear assembly including a sliding gear slidably mounted to the control rod and outer gears surrounding the sliding gear;
a rotatable handwheel operatively coupled to the valve block and rotatable about the axis, the handwheel having an internal gear positioned to engage the gear assembly; and
the gear assembly and the handwheel cooperating to transmit rotation of the handwheel to rotation and translation of the control rod.

29. The fluid regulator of claim 28, wherein the gear assembly is mounted within a housing attached to the valve block, the housing including an aperture for each of the outer gears, and wherein the outer gears are rotatably mounted between the housing and the valve block.

30. The fluid regulator of claim 28, wherein the control component is a pressure regulator.

31. The fluid regulator of claim 29, wherein the handwheel includes a viewing aperture, and including background disk mounted inside the handwheel and rotationally fixed relative to the valve block and the housing, the background disk positioned to be viewable through the viewing aperture and arranged to provide a visual indication of the operational parameter.

32. The fluid regulator of claim 31, wherein the inner gear includes outer cogs engaging the outer gears and inner cogs engaging the sliding gear, the inner cogs in engagement with cogs on the control rod.

33. A fluid regulator comprising:
a valve block having an inlet arranged for connection to a gas supply and an outlet arranged for connection to an item of gas equipment, the valve block further defining a flow path between the inlet and the outlet;
the valve block housing a plurality of internally mounted control components disposed in the flow path, the control components for controlling operational parameters of gas from the gas supply, the operational parameter comprising on-off state and at least one of gas pressure or gas flow;
a shut off valve disposed within the valve block for controlling the on-off state;
an on-off control slidably mounted to the valve block, the on-off control operatively coupled to the shut off valve;
an indicator panel mounted within the valve block and coupled to the on-off control, the indicator panel having a visual indicator of the on-off state; and
a viewing window formed in the valve block adjacent the indicator panel, the viewing window arranged to reveal the visual indicator on the indicator panel to thereby indicate the on-off state of the fluid regulator.

34. The fluid regulator of claim 33, wherein the on-off control is coupled to the shut off valve by a pivoting rocker, and wherein the on-off control includes a groove size to receive an end of the rocker.

35. The fluid regulator of claim 33, wherein the valve block includes a cylindrical outer surface, and wherein the viewing window is formed on a top portion of the outer surface.

36. The fluid regulator of claim 35, including a pressure gauge mounted to the valve block, and wherein the on-off control is rotationally offset relative to the pressure gauge.

37. The fluid regulator of claim 33, wherein the indicator panel is directly connected to the on-off control.

* * * * *